United States Patent

[11] 3,603,341

| | | |
|---|---|---|
| [72] | Inventor | Domer Scaramucci<br>3245 S. Hattie, Oklahoma City, Okla. 73129 |
| [21] | Appl. No. | 13,701 |
| [22] | Filed | Feb. 24, 1970 |
| [45] | Patented | Sept. 7, 1971 |

[54] LINED DISC VALVE AND MOLD FOR FORMING THE LINING
12 Claims, 10 Drawing Figs.

[52] U.S. Cl............................................................ 137/375,
251/306, 264/275, 18/36
[51] Int. Cl......................................................... F16k 1/22,
F16k 27/12
[50] Field of Search............................................ 251/306,
173; 137/375, 454.2; 18/36; 264/275

[56] References Cited
UNITED STATES PATENTS

| | | | | |
|---|---|---|---|---|
| 2,816,729 | 12/1957 | Jensen......................... | | 251/306 X |
| 3,173,650 | 3/1965 | Cotterman et al. .......... | | 251/306 |
| 3,329,398 | 7/1967 | Goldsmith..................... | | 251/306 |
| 3,425,439 | 2/1969 | Duffey et al. ................. | | 251/306 X |
| 3,450,151 | 6/1969 | Heutzenroeder............. | | 137/375 |
| FOREIGN PATENTS | | | | |
| 647,005 | 8/1962 | Canada ........................ | | 251/315 |

Primary Examiner—Henry T. Klinksiek
Attorney—Dunlap, Laney, Hessin & Dougherty

ABSTRACT: A disc valve having an elastomer lining, preferably molded in place in the valve body, fully protecting the valve body, including threads in the opposite ends of the body, from the fluid being controlled and forming a seat for the valve disc when the disc is in a closed position. Various seat configurations and stem seal configurations are disclosed. A multiple-piece mold for forming the lining is also disclosed.

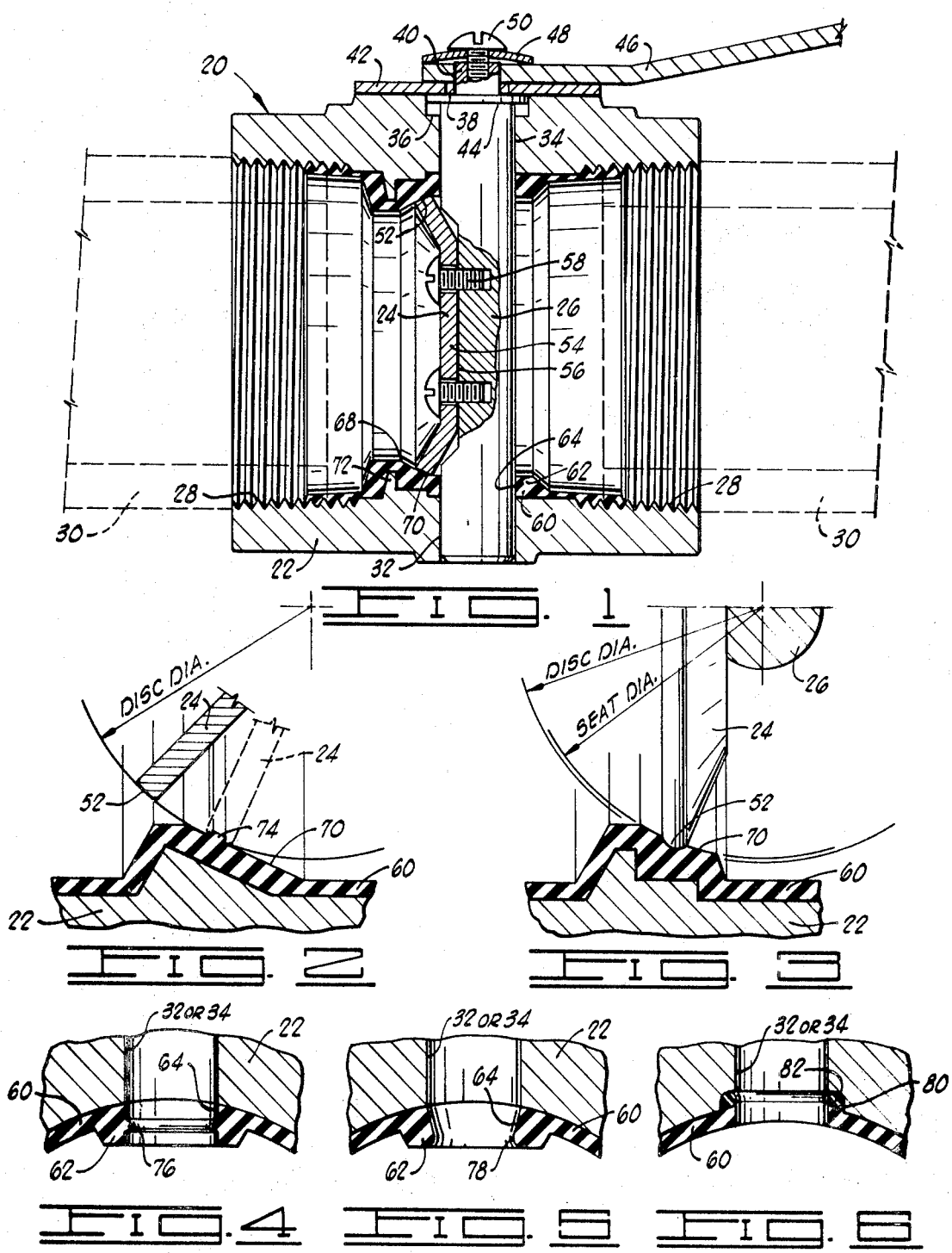

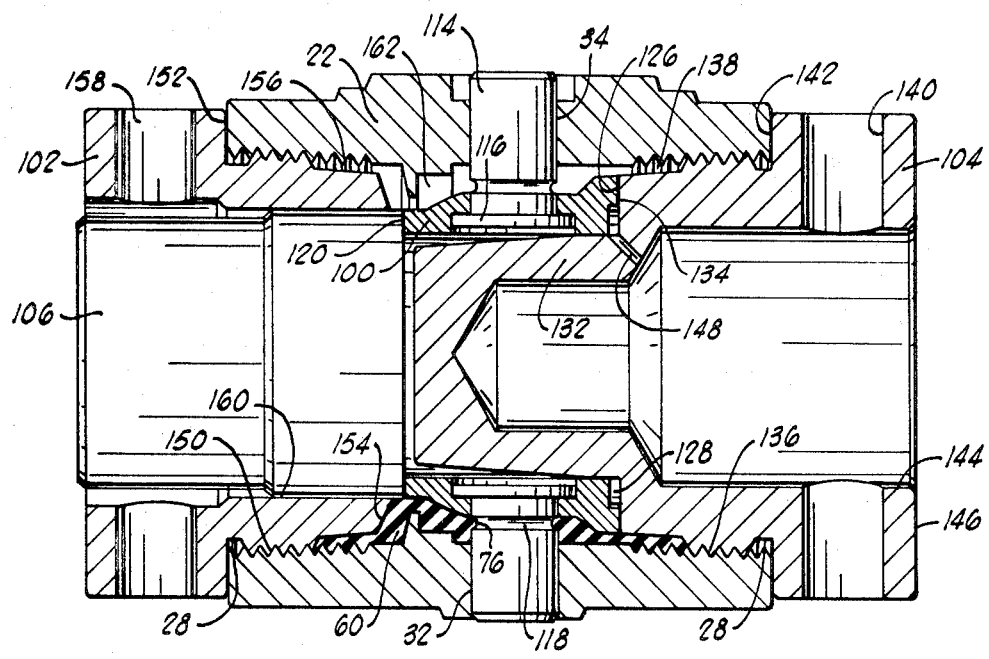

LINED DISC VALVE AND MOLD FOR FORMING THE LINING

BACKGROUND OF THE INVENTION

1. Field of the Invention

This invention relates to improvements in disc valves and molds for forming linings in disc valves.

2. Description of the Prior Art

The prior art contains many illustrations of the use of linings for disc- or butterfly-type valves for shielding the valve body from the fluid being controlled. However, and as typically illustrated in applicant's prior U.S. Pat. No. 3,118,465 and the U.S. Pat. of Killian No. Re. 26,405, such linings have been employed only in what are know as wafer-type valves when the lining was constructed to fully protect the valve body from the fluid being controlled. Wafer-type valves require the use of heavy and expensive pipe flanges at the opposite sides of the valve, resulting in a relatively expensive and heavy complete valve assembly. To the best of applicant's knowledge, no one has previously produced a disc valve of the threaded body type which was effectively lined for shielding the body from the fluid being controlled.

SUMMARY OF THE INVENTION

An object of this invention is to provide a disc valve having threads in the opposite ends of the valve body and a lining shielding all portions of the valve body from the fluid being controlled.

Another object of this invention is to provide an economically constructed disc valve having a long service life even in corrosive environments.

A further object of this invention is to provide a disc valve having a molded-in-place combination lining and seat wherein the lining provides effective valve stem seals.

A still further object of this invention is to provide a mold for efficiently forming a combination elastomer lining and seat in a disc valve having threads in the opposite ends of the valve.

Other objects and advantages of the invention will be evident from the following detailed description when read in conjunction with the accompanying drawings illustrating various embodiments of the invention.

BRIEF DESCRIPTION OF THE DRAWING

FIG. 1 is a vertical sectional view of a complete disc valve constructed in accordance with this invention.

FIG. 2 is a partial sectional view through a modified seat portion for the valve.

FIG. 3 is a partial sectional view of another modified seat for the valve.

FIG. 4 is a partial cross-sectional view illustrating one form of valve stem seal for the valve.

FIG. 5 is a partial sectional view illustrating another form of stem seal for the valve.

FIG. 6 is another partial cross-sectional view illustrating still another form of stem seal for the valve.

FIG. 7 is a vertical cross-sectional view through the valve body of the valve of FIG. 1 and the mold used in forming the lining for the valve body. The finished lining is shown in the lower half of the drawing and no lining is shown in the upper half of the drawing for clarity of illustration.

FIG. 8 is a plan view, partially in section, of a ring forming a portion of the mold.

FIG. 9 is a cross-sectional view taken along the lines 9—9 of FIG. 8.

FIG. 10 is a cross-sectional view taken along the lines 10—10 of FIG. 9.

DESCRIPTION OF THE PREFERRED EMBODIMENTS

Referring to the drawings in detail, and particularly FIG. 1, reference character 20 generally designates a disc valve constructed in accordance with this invention. The valve 20 basically comprises a tubular valve body 22 having a disc 24 supported therein by a stem 26 extending transversely through the body.

The body 22 has standard internal pipe threads 28 formed in the opposite ends thereof to threadedly receive the adjacent threaded ends of pipe sections 30 through which the fluid being controlled is designated to flow. A pair of diametrically opposed apertures 32 and 34, sometimes referred to as journals, are formed in the medial portion of the body 22 to journal the opposite end portions of the stem 26 in the body. A counterbore 36 is formed in the outer end of the journal 34 to receive a thrust washer 38. The thrust washer 38 has a noncircular opening (not shown) therethrough to receive a noncircular end portion 40 of the stem 26 in order that the washer 38 will be nonrotatably mounted on the stem. An indexing plate 42 is secured to the valve body 22 loosely around the portion 40 of the stem 26 by suitable screws or the like (not shown) to engage the thrust washer 38 and hold the thrust washer 38 against a shoulder 44 formed around the stem 26 between the main body portion of the stem and the reduced portion 40. A suitable handle 46 is mounted on the noncircular portion 40 of the valve stem 26 and is suitably keyed (not shown) to the index plate 42 to limit the turning movement of the stem 26 and the disc 24 to substantially 90° in the usual manner. The handle 46 is held on the stem 26 by a spring washer 48 and a screw 50 threadedly secured in the portion 40 of the stem 26. It will thus be seen that the spring washer 48 will tend to hold the stem 26 in a fixed lengthwise position, but, since the thickness of the thrust washer 38 is less than the depth of the counterbore 36, the stem 26 is free to move a minor distance lengthwise from the position shown in FIG. 1 to facilitate the centering of the disc 24 in the body 22 and enhance full circle seating of the disc 24 as will be set forth more in detail below.

The disc 24 is preferrably in the form of a stamped plate having its outer edge or periphery 52 rounded and being slightly dished with a flat central portion 54 fitting against a flat cutaway portion 56 formed on one side of the stem 26. The disc 24 is held fixed against the cutaway portion 56 of the stem 26 by suitable screws 58 such that the disc 24 is what is known in the art as an "offset" disc.

A lining 60 of elastomeric material covers and is bonded to the inner periphery of the body 22 from a medial portion of the threads 28 at one end of the body to a medial portion of the threads 28 at the opposite end of the body. The lining 60 is formed of any suitable elastomeric material which may be vulcanized or bonded to the inner periphery of the valve body, but is preferably a rubber composition and is preferably molded in place in the valve body for economy of manufacture and to enhance the bonding of the lining to the valve body.

That portion 62 of the lining 60 encircling the stem 26 adjacent each of the journals 32 and 34 is decreased in diameter to provide at least a partial boss of the elastomeric material surrounding the stem 26. Also, the diameter of each of the openings 64 in the lining 60 surrounding the stem 26 is, in the relaxed condition of the lining, less than the diameter of the stem 26. Therefore, the lining 60 forms an interference-type stem seal around the stem 26 adjacent each of the journals 32 and 34, and the projection of the portions 62 radially into the valve body provides surfaces against which the pressure of fluid being controlled by the valve will act to press the elastomeric lining around the stem 26 and augment the sealing effectiveness of the stem seals.

The lining 60 is further gradually decreased in diameter from one side of the boss 62 to a point 68 to provide a tapered or frustoconical seating surface 70 surrounding the outer periphery 52 of the disc 24 when the disc 24 is arranged in a plane transverse to the longitudinal axis of the body 22. The diameter of the seating surface 70 varies from slightly greater than to slightly less than the diameter of the outer periphery 52 of the disc 24 in order that the disc 24 will have an interference fit in the seat portion 70 when the disc 24 is moved to a closed positions as illustrated in FIG. 1. It may also be noted in FIG. 1 that a circumferential projection 72 is preferably formed on the inner periphery of the body 22 on the side of the seat portion 70 opposite the stem 26 to provide additional support for the seat portion 70 and minimize the possibility of extrusion of the elastomeric material away from the disc 24 in the event the fluid pressure is from the right-hand side of the valve as illustrated in FIG. 1 when the valve is closed.

OPERATION

In the installation of the valve 20, the threaded end of each pipe section 30 is threaded into the respective internal threads 28 at the respective end of the valve body 22 to such an extent that a portion of the threads on the pipe section engage the respective end of the lining 60 covering the inner end portion of the respective body threads 28, such that the adjacent ends of the pipe sections 30 will be effectively sealed to the body 22 and fluid flowing through the pipe sections and the valve will not come in contact with the body 22 beyond the ends of the lining 60. Also, since the lining 60 completely covers the inner periphery of the body 22 between the adjacent ends of the pipe sections 30 and forms effective stem seals around the stem 26, the fluid being controlled by the valve has no opportunity to contact the body 22. Therefore, the body 22 may be made of the most economical material available which will provide the necessary strength, even when highly corrosive fluids are being handled. The lining 60 may be easily selected from a material which will withstand the corrosive action of the fluid being handled. It will then only be necessary to select the appropriate material for the disc 24, stem 26 and screws 58 which will withstand the corrosive action of the fluid being handled.

When the disc 24 is positioned in a plane transverse to the longitudinal axis of the body 22, the outer periphery 52 of the disc will engage the seat portion 70 of the lining 60 and provide an effective closure of the valve against flow of fluid in either direction. It will also be observed that since the disc 24 is of the offset type, and is of an outer diameter less than the distance between the diametrically opposed bosses 62, the disc will not interfere with the stem seals provided by the bosses 62 in any operating position of the disc. In other words, the disc 24 may be turned between its open and closed positions without interfering with that portion of the lining 60 forming the stem seals.

Molding of the lining 60 in place in the body 22 facilitates the positioning and sizing of the seat portion 70 for accurate engagement by the disc 24. In addition, however, the disc 24 is allowed a small adjustment in a plane parallel to the axis of the stem 26 by virtue of the allowable endwise movement of the stem 26 as previously described, such that the uniform seating of the outer periphery 52 on the seat portion 70 is facilitated and the disc and seat portion will provide what is known in the art as full circle seating.

SEAT MODIFICATIONS

As shown in FIG. 2, the seating surface 70 may have a diameter such that the outer periphery 52 of the disc 24 will only very lightly engage the tapered portion of the seating surface. In this event, the seating surface is provided with an annular bead 74 located in such a position to be engaged by the outer periphery 52 of the disc 24 when the disc 24 is in a fully closed position. This type of construction reduces the interference between the disc and the seat to reduce the torque required for opening and closing the valve relative to that type of seat structure previously described in connection with FIG. 1.

FIG. 3 illustrates another slight variation of the configuration of the seating surface 70 in that the seating surface is formed on a segment of a sphere having a diameter slightly less than the diameter of movement of the outer periphery 52 of the disc 24, such that the disc 24 will have interference with the seating surface 70 whenever the outer periphery 52 of the disc is opposite any portion of the seating surface. This structure minimizes the precision required in positioning the disc 24 is a fully closed position.

STEM SEAL MODIFICATIONS

As shown in FIG. 4, a distinct sealing bead 76 may be formed in each stem opening 64 of the lining 60 to sealingly engage the stem 26 and enhance the stem seals provided by the lining 60. Alternately, the diameter of each opening 64 may be gradually decreased from the radial outer surface of the lining 60 toward the inner edge of the respective boss 62 as shown in FIG. 5. Such shaping of each opening 64 effectively provides a sealing bead 78 for sealingly engaging the stem 26 and enhancing the effectiveness of the stem seals.

FIG. 6 illustrates another technique for stem sealing useful with the lining 60. In this structure, in lieu of the bosses 62, a counterbore 80 is formed in the radially inner end of each of the journals 32 and 34 to receive an O-ring 82, and the lining 60 is extended into and molded in the radial inner end of the respective counterbore 80 into engagement with the O-ring 82. It will thus be seen that the O-ring 82 will sealingly engage the stem 26 and effectively prevent the leakage of fluid around the stem. It will further the understood by those skilled in the art that the O-ring 82 could be molded into the lining 60 at the radially inner end of each of the journals 32 and 34 to sealingly engage the stem, if desired.

MOLDING

A preferred mold for forming the elastomeric lining 60 is illustrated in FIG. 7 and basically comprises a ring 100 adapted to be positioned in the medial portion of the body 22; endpieces 102 and 104 adapted to be threaded into the opposite ends of the body 22, and a piston 106 adapted to be reciprocated into and out of the endpiece 102 for injecting the elastomeric material into the body for a subsequent curing operation.

The ring 100 is shown in FIGS. 8, 9 and 10 and, as will be observed, has an inner periphery 108 of substantially uniform diameter. Diametrically opposed apertures 110 are formed in the medial portion of the ring 100 and a counterbore 112 is formed at the radially inner end of each aperture 110 to receive positioning pins 114 (FIG. 7) positioned in the body journals 32 and 34. As will be observed in FIG. 7, a circumferential head 116 is formed on the inner end of each of the positioning pins 114 to fit in the counterbores 112 of the ring 100 for the proper positioning of the pins 114 relative to the ring 100. It may also be noted at this point that each of the pins 114 has an annular groove 118 in the outer periphery thereof located adjacent the outer periphery of the ring 100 of form the stem seal sealing beads 76 of the type previously discussed in connection with FIG. 4.

The outer periphery of the ring 100 is tapered outwardly from adjacent one end 120 of the ring to a medial portion of the ring, as illustrated in FIG. 8, to provide a frustoconical surface 122 and thereby form the seating surface 70 of the lining 60, as will be discussed further below. It will also be observed in FIGS. 8 and 9 that a substantially circular recess 124 is formed in the outer periphery of the ring 100 at the radially outer end of each aperture 110. Each recess 124 extends from the medial portion of the frustoconical surface 122 to adjacent the end 126 of the ring 100 to form the bosses 62 of the lining 60, which bosses merge into the seating surface 70, as will be observed in FIG. 1. Finally, a counterbore 128 is formed in the end 126 of the ring 100 concentrically around the inner periphery of the ring, and a restricted passageway 130 extends from the counterbore 128 to the outer periphery of the ring 100 for removing air from the spaced to be filled with the elastomeric lining material and for the ejection of excess elastomeric material which may be placed in the body 22, as will be described.

The ring 100 is held in the desired position in the body 22 by the endpiece 104. A cylindrical projection 132 is formed on the inner end of the endpiece 104 and slidingly engages a portion of the inner periphery 108 of the ring 100 to hold the ring to where the centerline of the ring correspond to the longitudinal axis of the body 22. A circumferential shoulder 134 on the endpiece 104 is arranged to engage the end 126 of the ring 100 and, in cooperation with the positioning pins 114, hold the ring 100 in the desired lengthwise position in the body 22. The endpiece 104 has external threads 136 thereon sized to mate with the threads 28 in the respective end of the body 22, but the threads 136 have a length less than the length of the respective threads 28, and when the shoulder 134 on the endpiece 104 contacts the end 126 of the ring 100, the threads 136 extend only to the medial portion of the body threads 28. Also, the outer diameter of the endpiece 104 from the threads 136 to the shoulder 126 is less than the inner diameter of the surrounding portion of the body 22 to provide a space 138 between this portion of the endpiece 104 and the inner periphery of the body 22 for the reception of elastomeric material in the formation of the liner 60 as will be noted below.

Diametrically opposed holes 140 are formed in the outer end portion of the endpiece 104 for the reception of a suitable tool by means of which the endpiece is threaded into the body 22. It will also be noted that a shoulder 142 is provided around the endpiece 104 to abut the respective end of the body 22 when the endpiece is threaded the desired distance into the body to prevent undue pressure being applied to the ring 100.

A bore 144 extends from the outer end 146 of the endpiece 104 through the major portion of the length of the endpiece, and a restricted passageway 148 extends through the wall of the endpiece 104 from the bore 144 into communication with the counterbore 128 formed in the end 126 of the ring 100 for bleeding off air from the spaces receiving the elastomeric lining material and for the ejection of excess elastomeric material introduced into the body 22 as will be set fort below.

The endpiece 102 has threads 150 formed on the outer periphery thereof to mate with the threads 28 in the respective end of the body 22. However, the threads 150 are of a length less than the length of the respective threads 28, and a shoulder 152 is formed on the outer periphery of the endpiece 102 to engage the respective end of the body 22 and limit the inward movement of the endpiece 102 into the body. Therefore, the threads 150 terminate in the medial portion of the respective threads 28. Also, the outer diameter of the endpiece 102 from the threads 150 to the inner end 154 of the endpiece is less than the inner diameter of the surrounding portion of the body 22 to leave a space 156 for the formation of the respective end of the liner 60 as will be set forth below.

Diametrically opposed holes 158 are formed in the outer end portion of the endpiece 102 to receive a suitable tool by means of which the endpiece 102 is threaded into the respective end of the body 22. Also, a bore 160 is formed throughout the length of the endpiece 102 to slidingly receive the piston 106 as previously mentioned.

In use of the mold disclosed in FIG. 7, the ring 100 is first placed in position in the medial portion of the body 22 and then the positioning pins 114 are inserted through the ring and into the journals 32 and 34 of the body 22 in the positions shown in FIG. 7. The endpiece 104 is then threaded into the respective end of the valve body 22 until the shoulder 134 contacts the end 126 of the ring 100 and the shoulder 142 contacts the respective end of the body 22. At this time, the ring 100 will be precisely positioned with the centerline thereof in line with the longitudinal centerline of the body 22 to provide an annular space 162 around the outer periphery of the ring communicating with the annular space 138 around the portion of the endpiece 104 adjacent the shoulder 134.

The endpiece 102 is then threaded into the opposite end of the body 22 until the shoulder 152 engages the respective end of the body, such that the annular space 156 around the inner end portion of the endpiece 102 is in communication with the annular space 162 around the ring 100.

The desired amount of uncured elastomeric material is then deposited in the bore 160 of the endpiece 102 and the piston 106 is moved inwardly toward the ring 100 by any suitable mechanism to completely fill the annular spaces 156, 162 and 138 with the uncured elastomeric material. The piston 106 is moved inwardly in the endpiece 102 until it engages the end 120 of the ring 100. Air displaced from the annular spaces 156, 162 and 138, and any excess uncured elastomeric material not required to fill the annular spaces 156, 162 and 138 is squeezed out through the passageway 130 (FIG. 8), the counterbore 128 and the passageway 148 (FIG. 7) into the bore 144 where it may be disposed of. It may also be noted that the various surfaces of the ring 100, pins 114, endpiece 104, endpiece 102 and piston 106 exposed to the uncured elastomeric material are coated with a suitable material to prevent the elastomer from adhering to such surfaces, as is a common technique in the art.

While the piston 106 is retained in the position shown in FIG. 7, the entire assembly shown in FIG. 7 is heated to the necessary temperature for the necessary period of time to cure the elastomeric material forming the lining 60 in order that the lining will be tightly adhered to the body 22. In this latter connection, it may also be noted that the surfaces of the body 22 contacted by the elastomeric material may be coated with a suitable bonding agent to facilitate the adherence of the elastomeric material to the body, as is well known to those skilled in the art.

After the elastomeric material is cured, the various portions of the mold used for forming the lining 60, namely the piston 106; endpiece 102, endpiece 104, ring 100 and pins 114 are removed from the body 22 to leave the lining 60 in place and having a configuration as illustrated in FIG. 1 and previously described. The valve body 22 is then ready for reception of the stem 26, disc 24 and the various members for attaching the handle 46 to the stem in the complete assembled arrangement as illustrated in FIG. 1.

From the foregoing it will be apparent that the present invention provides an economically constructed disc valve of the threaded body type wherein the body will be completely shielded from fluid being handled by the valve. The elastomeric lining extends over a portion of the threads at each end of the valve body in a position to be engaged by the adjacent threaded ends of the pipe sections to which the valve is to be connected to prevent the fluid being handled from contacting the valve body at the ends of the lining. Also, the lining forms effective stem seals for the valve and the seat for valve. It will also be apparent that the present invention provides a novel mold structure for molding the elastomeric lining in place in the valve body with the desired configuration.

Changes may be made in the combination and arrangement of parts or elements as heretofore set forth in the specification and shown in the drawings without departing from the spirit and scope of the invention as defined in the following claims.

What is claimed is:

1. A disc valve for controlling the flow of fluid through adjacent sections of conduit having threaded end, comprising:
   a body of relatively rigid material having a bore extending longitudinally therethrough and threads formed in the opposite ends of the bore for receiving the threaded ends of the adjacent sections of conduit, said body also having a pair of diametrically aligned valve stem journals in the wall thereof between said threads;
   a stem extending at least partially through said journals;
   a disc carried by the stem within said bore;
   means secured to the stem externally of the body for turning the stem and disc; and
   an elastomer molded-in place and bonded around the entire inner periphery of the body between the threads and including portions of said threads engaged by the threaded ends of the adjacent sections of conduit, shielding the body from contact with the fluid being controlled, a portion of said elastomer being shaped to be sealingly engaged by the entire outer periphery of the disc when the disc is positioned in a plane transverse to the axis of said bore to prevent the flow of fluid through the valve.

2. A valve as defined in claim 1 wherein the elastomer surrounds and sealingly engages the stem adjacent each of said journals to prevent the leakage of fluid between the stem and either of said journals.

3. A valve as defined in claim 2 wherein a bead is formed on the elastomer around the stem adjacent each of said journals.

4. A valve as defined in claim 1 wherein the disc is offset from the axis of the stem.

5. A valve as defined in claim 4 wherein the disc comprises a stamped plate, and characterized further to include screws securing the disc to the stem.

6. A valve as defined in claim 4 wherein the elastomer is shaped to form a boss around at least a portion of the stem adjacent each of the journals, each of said bosses being exposed to the pressure of the fluid being controlled by the valve.

7. A valve as defined in claim 1 characterized further to include an O-ring in a mating groove in each journal surrounding and sealingly engaging the adjacent portion of the stem.

8. A mold for forming an elastomer lining in a tubular valve body having internal threads in the opposite ends thereof and a pair of diametrically opposed valve stem journals in the wall of the body between the threads, comprising:

a ring having an outer diameter less than the inner diameter of the body; a length less than the distance between said threads, and a pair of diametrically opposed apertures in the medial portion thereof;

a pair of pins, each of which extends through one of the journals and one of said apertures for supporting the ring in the body;

a first substantially cylindrical member in one end of the body engaging the adjacent end of the ring, the inner end portion of said member from the adjacent end of the ring to a medial portion of the threads in the body at the respective end of the body having an outer diameter less than the inner diameter of the surrounding portions of the body and body threads, and said member having external threads thereon adjacent said inner end portion threadedly engaging a portion of the threads in the respective end of the body;

a second substantially cylindrical member in the opposite end of the body having its inner end adjacent the ring, the inner end portion of said second member from the inner end thereof to a medial portion of the threads in the body at the respective end of the body having an outer diameter less than the surrounding portions of the body and body threads, said second member having external threads thereon adjacent the inner end portion thereof threadedly engaging a portion of the threads in the respective end of the body, said second member also having a bore extending longitudinally therethrough; and a piston reciprocally disposed in the bore of said second member adapted to move inwardly with respect to the valve body into engagement with the respective end of the ring for forcing uncured elastomer into the annular space surrounding the ring and the inner end portions of said first and second members for subsequent curing into said lining.

9. A mold as defined in claim 8 wherein each of said first and second members has an external shoulder thereon to engage the respective outer end of the valve body and limit the inward movement of the respective member into the body.

10. A mold as defined in claim 8 wherein said first member has a substantially cylindrical extension on the inner end thereof engaging the inner periphery of the ring and holding the ring concentrically in the valve body.

11. A mold as defined in claim 8 wherein said first member has a longitudinal bore extending partially therethrough from the outer end thereof, and wherein the ring and said first member have mating restricted apertures therein providing communication from the outer periphery of the ring to said bore in said first member for bleeding off air displaced by the elastomer being injected into the body and for disposing of excess uncured elastomer injected into the valve body.

12. A mold as defined in claim 8 wherein each of said pins has an annular groove in the outer periphery thereof adjacent the outer periphery of the ring to form a sealing bead in the lining around each of said pins.